June 28, 1960  J. O. EAMES  2,942,699
FLUID PRESSURE BRAKE MECHANISM
Original Filed June 11, 1956  4 Sheets-Sheet 1

INVENTOR
JAMES O. EAMES
BY Scrivener + Parker
ATTORNEYS

June 28, 1960 J. O. EAMES 2,942,699
FLUID PRESSURE BRAKE MECHANISM
Original Filed June 11, 1956 4 Sheets-Sheet 2

INVENTOR
JAMES O. EAMES

BY Scrivener & Parker
ATTORNEYS

June 28, 1960   J. O. EAMES   2,942,699
FLUID PRESSURE BRAKE MECHANISM
Original Filed June 11, 1956   4 Sheets-Sheet 3
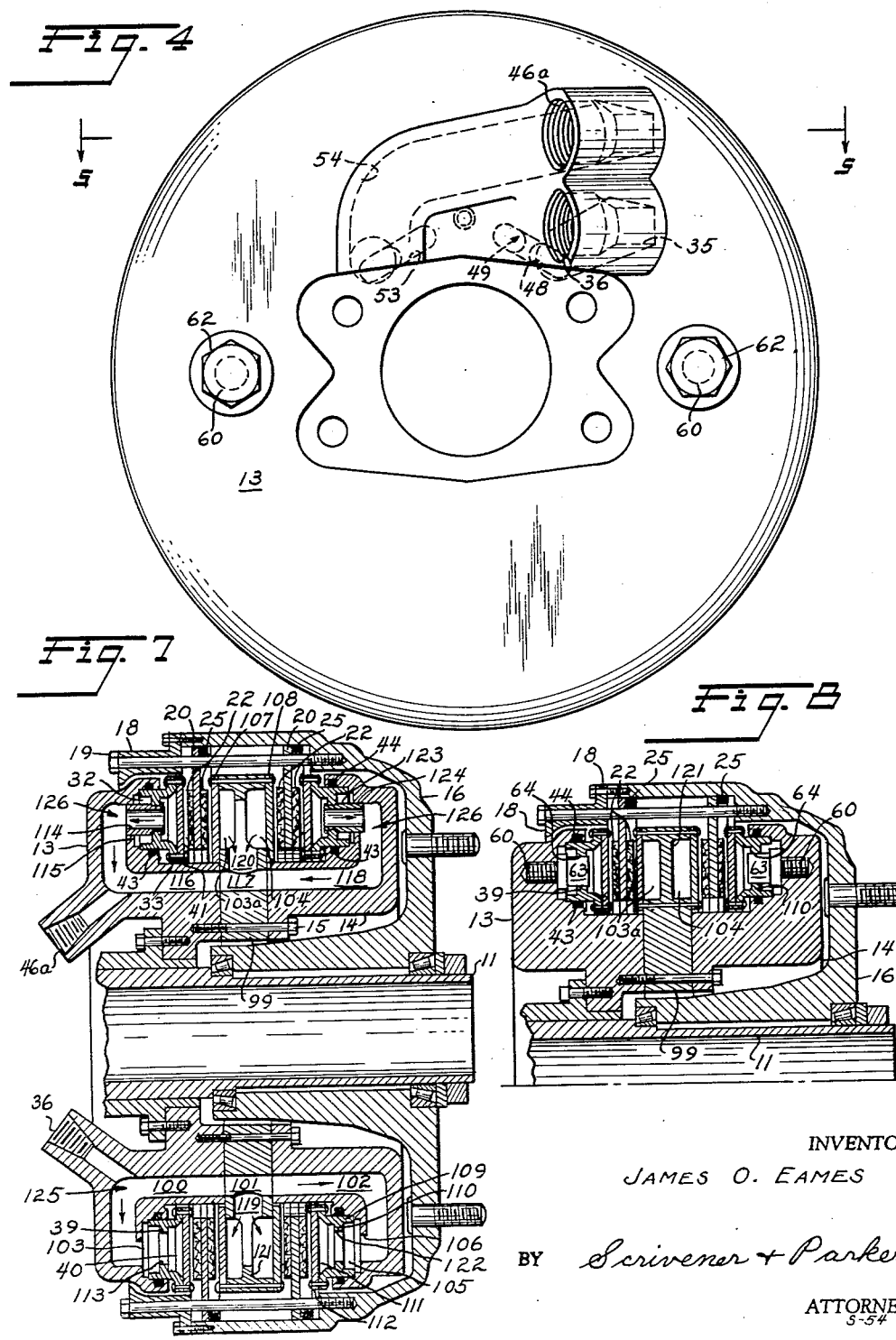
INVENTOR
JAMES O. EAMES
BY Scrivener + Parker
ATTORNEYS

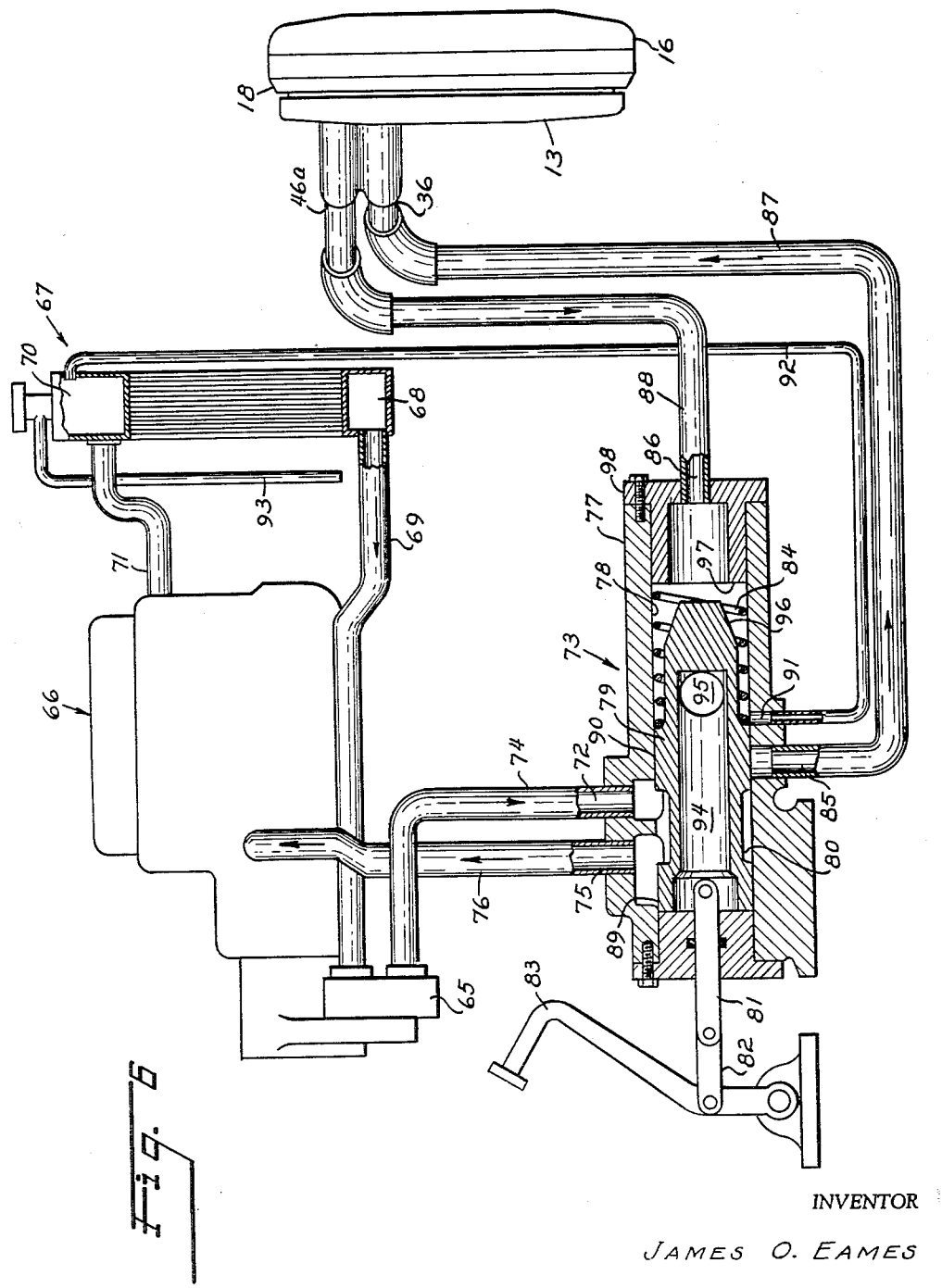

[#] 2,942,699

FLUID PRESSURE BRAKE MECHANISM

James O. Eames, Washington, Conn., assignor to Roy S. Sanford, Woodbury, Roger H. Casler and James O. Eames, Washington, and Wilfred A. Eaton and Erling D. Sedergren, Woodbury, Conn.

Continuation of abandoned application Ser. No. 590,618, June 11, 1956. This application Sept. 23, 1957, Ser. No. 686,271

16 Claims. (Cl. 188—264)

This invention relates to frictional mechanism, and more particularly to friction brake mechanism of the type wherein friction elements are utilized which are cooled by a circulating liquid under pressure, and wherein fluid pressure responsive means are provided for effecting engagement of the friction elements.

More particularly, this invention relates in general to brake mechanisms of the type set forth in the co-pending application of Roy S. Sanford and James O. Eames, Serial Number 475,072, filed in the United States Patent Office on Dec. 14, 1954, now Pat. No. 2,821,273. The present invention includes improvements over the mechanisms set forth in the above application, and one of the objects of the invention is to provide a simplified form of brake mechanism requiring a minumum number of parts.

As set forth in the above referred to application, metallic friction elements are provided which preferably are adapted to engage rotating friction discs or rings of relatively non-heat conductive composition material, the entire surfaces of the metallic friction elements directly opposite the surfaces in engagement with the friction rings being cooled by the action of a circulating liquid, and supported against mechanical distortion by the pressure of that liquid, the areas of the actuating means for the friction elements and the areas of the engaging portions of the friction elements and the portions supported by the pressure of the liquid being so chosen as to obtain a balance of forces in both directions on the metallic friction elements which engage the friction rings during a brake application.

In a disc brake having two metallic friction elements and two composition friction rings engageable therewith, the use of two pressure responsive elements has previously been required to effect frictional engagement of the elements, and it is one of the objects of the invention to accomplish the above result with the use of a single pressure responsive element, or in the case where four metallic friction rings and composition friction rings are utilized, for example, to accomplish the desired result with the use of only two pressure responsive members or pistons.

A further object of the invention is to provide means for supporting all of the metallic friction elements in the brake against distortion due to their mechanical engagement with the rotating composition friction rings of the brake.

Still another object of the invention is to provide a brake mechanism of the above type wherein the number of moving parts utilized is reduced to a minimum.

Another object of the invention is to provide, in a brake of the above type, means for effectively separating the engaging friction elements on release of the brake in order to prevent dragging of the brakes.

A further object is the provision of novel means for directing the flow of circulating liquid through the brake mechanism in an efficient and simple manner.

Yet another object of the invention is to provide a construction wherein the inlet and outlet conduits for cooling liquid leading to and from the brake mechanism may be readily connected thereto without interference with other parts of the vehicle.

Still another object of the invention is to provide means for automatically compensating for wear of the friction elements of the brake.

Another object is the provision of means for directing the flow of cooling liquid through the brake to effect substantially uniform cooling of the friction elements of the brake.

The above and other objects and novel features of the invention will be more fully understood when considered in the light of the following description and the accompanying drawings. It is to be specifically understood, however, that the drawings are utilized for purposes of illustration only, reference being had to the appended claims for a definition of the limits of the invention.

In the drawings, wherein similar reference characters are utilized to identify similar parts throughout the several views:

Fig. 4 is a plan view of the brake looking outward along the axle of the vehicle;

Fig. 6 is a diagrammatic view, partially in section of a control system for circulating cooling liquid through the brake actuator and controlling the pressure of said liquid therein;

Fig. 7 is a sectional view of a multiple disc brake constructed in accordance with the principles of the invention; and Fig. 8 is a partial sectional view of Fig. 7, taken at 90° to the showing of that figure.

Figures 1, 5:
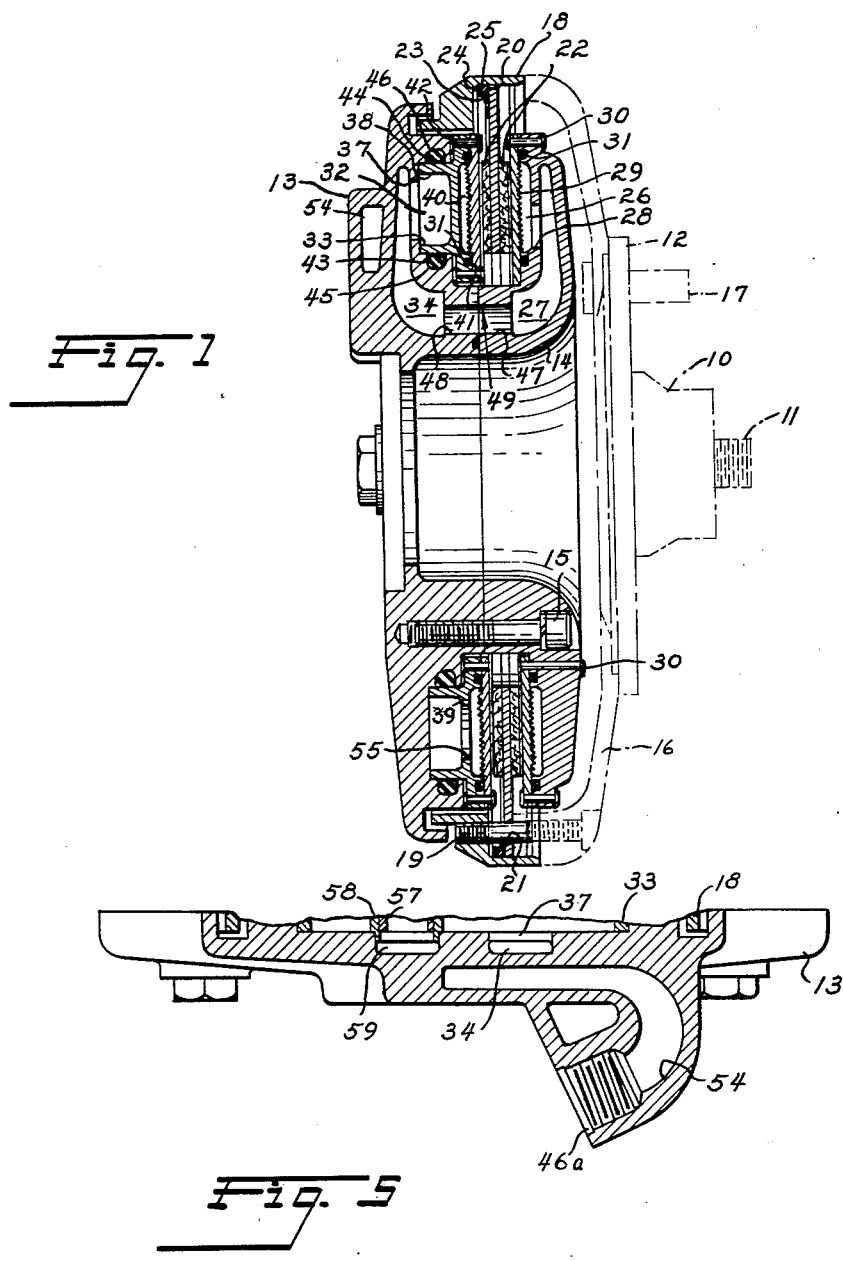
Fig. 1 shows a sectional view of a hydraulically operated and liquid cooled brake mechanism constructed in accordance with the principles of the present invention, the section being taken along line 1—1 of Fig. 2.
Fig. 5 is a sectional view taken along lines 5—5 of Fig. 4.

Referring first to Fig. 1 of the drawings, the brake mechanism includes a hub 10 rotatably mounted on an axle 11 and having a flange 12 as shown. A brake cylinder member 13 is suitably secured to the vehicle axle against rotation, and a friction element supporting member 14 is secured thereto as by means of bolts or cap screws 15. A rotatable brake member 16 is secured to the flange 12 for rotation therewith by means of studs 17, and an annular member 18 is secured thereto by means of cap screws 19. A metallic lining disc 20 is provided around its periphery with bores 21 in slidable engagement with the cap screws 19, so that the lining disc rotates with the hub and with the members 16 and 18, composition friction rings 22 being secured to either side of the lining disc as shown for rotation therewith. A metallic ring member 23 is secured to the outer periphery of the disc 20 by means of welding or otherwise, and serves in connection with the face of the disc, to provide a groove 24 along the outer periphery of the lining plate. A resilient member or O ring 25 of rubber-like material is disposed in said groove, being under compression between the bottom of the groove and the inner surface of the member 18, and in slidable engagement with the latter surface, for purposes to be more fully described hereinafter. As will be explained later, the resilient member may be disposed under compression between other portions of the lining disc and drum in sliding engagement with one and movable bodily with the other, if desired.

An annular channel 26 is formed in the stationary brake member 14, the channel being open at its left end in line with and concentric with and of substantially the same or greater area than the right hand friction ring 22. An inlet chamber 27 is also formed in the member 14 and is connected with the channel 26 by means of a port 28 in the member. The left end of the channel is closed by an annular metallic friction element 29, preferably of a highly conductive metal such as copper, the friction element being secured to the member 14 along its inner and outer peripheral portions and in sealing engagement with the member as by means of rivets 30. If desired, resilient O rings 31 may be disposed in channels in the left face of the member 14 in order to insure against leakage between the metallic friction element and the member.

The stationary brake cylinder member 13 is provided with a concentric annular channel 32, which forms a cylinder for the reception of a piston 33 slidably mounted therein. An inlet passage or chamber 34 is formed in the member 13 and registers at its lower end with the corresponding passage 27 in the member 14. The inlet chamber 34 connects, through passages to be described, with a cored passage 35 in member 13, which in turn connects with inlet port 36 shown in Fig. 4 of the drawings. A port 37 in the member 13 serves to connect the channel 32 and the inlet passage 34. The piston 33 is of the rigid type having inner and outer concentric rings 38 connected intermediate the ends of the piston by means of annular partitions 39. This partition is spaced to the left from the right end of the piston, and thus forms a channel 40 for the circulation of cooling liquid in the right end of the piston. This channel substantially corresponds in area and alignment with the channel 26 in member 14, and is closed at its right end by means of a second annular metallic friction element 41 secured along its inner and outer peripheral portions to the right end of the piston in sealing engagement therewith by means of rivets 42. The partition forms a back wall for the channel. In order to prevent leakage past the piston, inner and outer O rings 43 and 44 are inserted under compression in grooves 45 and 46 in the cylinder walls, the rings being in frictional sliding engagement with the outer walls of the piston as shown. From the foregoing, as will be described more fully hereafter, it will be apparent that in the event liquid under pressure is present in the cylinder 32 and in the pressure chamber formed by the cylinder and piston, the piston will be urged to the right, thus effecting engagement between the metallic friction element 41 and the left hand friction ring 22, and thereafter sliding the lining disc 20 bodily to the right to effect engagement of the right hand friction ring 22 with the right hand metallic friction element 29.

Figure 2:
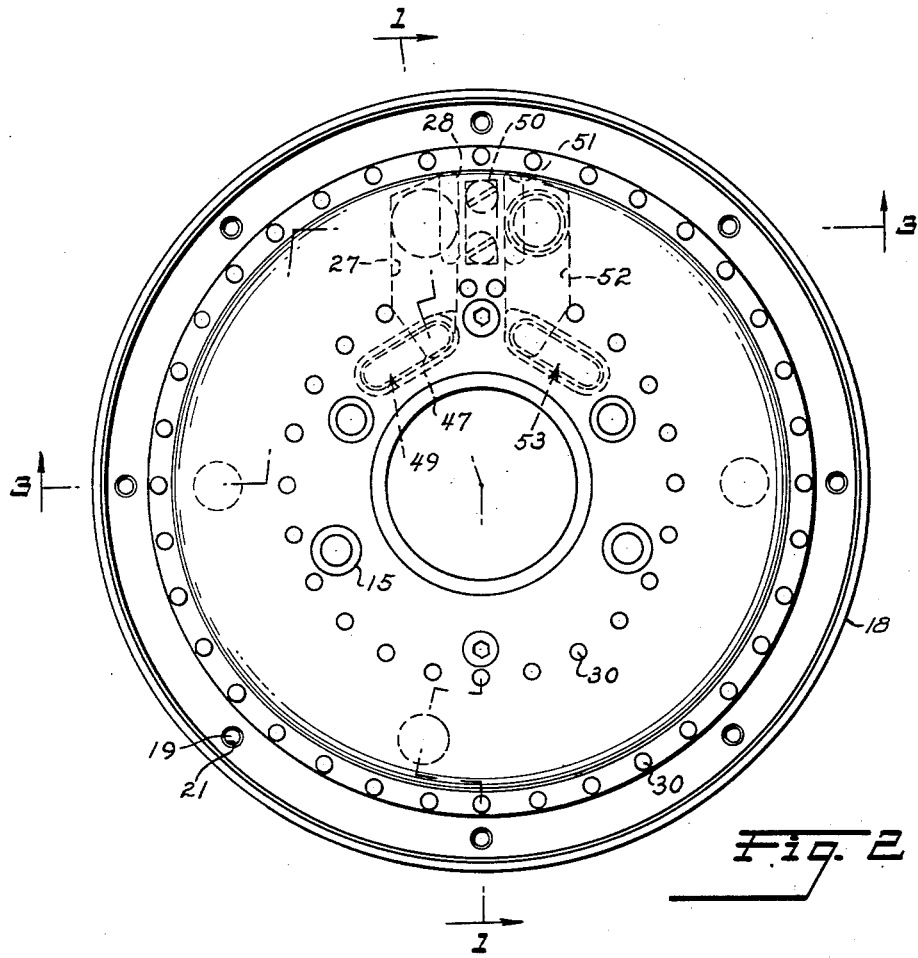
Fig. 2 is an end view of the brake of Fig. 1 taken from the right with the outer housing removed.
Figure 3:
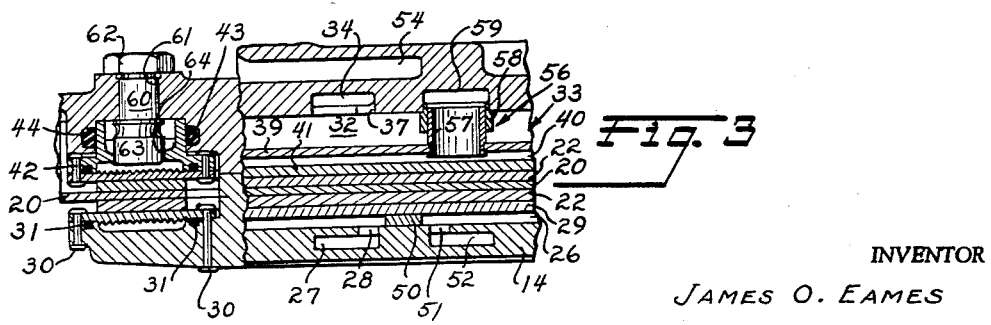
Fig. 3 is a sectional view taken along line 3—3 of Fig. 2.

During the operation of the brake, cooling liquid is supplied to the brake mechanism through the inlet port 36, and is discharged from the brake through an outlet port 46a shown in Fig. 4. The path of the cooling liquid through the brake will now be described. Referring first to the flow of liquid through the channel 26 in the member 14, it will be noted that the lower ends of the cored passages 27 and 34, as shown in Fig. 1, are provided with registering portions 47 and 48, and as indicated in dotted lines in Figs. 2 and 4, these registering portions are elongated, and combine to form an enlarged plenum chamber or pressure chamber 49 which is effective in insuring an equalized distribution of cooling fluid to the cored passages 27 and 34, and thence to the channels 26 and 40 in the brake. The liquid passes from the inlet port 36 to the plenum chamber 49 through a cored passage 35 in the member 13, and thence to the channel 26 in the member 14 through the cored passage 27 and the port 28 as shown in Fig. 1. A dam 50 is secured to the member 14 in the channel 26 as shown in Figs. 2 and 3, and serves to close the channel against the passage of liquid in the upper portion of the channel. In Fig. 2, the liquid entering the channel through the port 28 is prevented from circulating through the channel in a clockwise direction by the dam, and accordingly circulates through the channel in a counterclockwise direction until it reaches the right side of the dam at the upper end of the channel. An outlet port 51 is provided in the wall of the channel as shown in Fig. 3, and serves to connect the channel with a cored passage 52 formed in the member 14 connected to an outlet plenum chamber 53 formed in the members 13 and 14 in the same manner as the inlet plenum chamber 49. The outlet plenum chamber in turn is connected with the outlet port 46a by means of a cored passage 54, this passage being formed in the member 13 as shown in Figs. 4 and 5.

Thus it will be apparent that the liquid passing through the cooling channel 26 behind the metallic friction element 29 enters by way of port 36, cored passage 35, plenum chamber 49, cored passage 27, and port 28. The liquid passes around the channel through approximately 360°, and leaves the channel by way of port 51, cored passage 52, outlet plenum chamber 53, outlet cored passage 54 and the outlet port 46a.

Referring now to the passage of liquid through the cooling liquid channel 40 in the cylinder 32 and the piston, the liquid is supplied to the plenum chamber 49 as heretofore stated, and thence to the cylinder or pressure chamber through cored passage 34 and port 37. From this point, the cooling liquid circulates through the cylinder, and as shown in Fig. 1, enters the channel 40 in the piston through a piston inlet port 55. From this point, the liquid can circulate through the channel to the top portion thereof in either direction, and is discharged through a tubular dam mechanism 56, shown in detail in Fig. 3. This tubular dam mechanism includes a tubular member 57 secured to the partition 39 of the piston for movement with the piston, this tubular member being slidably mounted in a second tubular member 58 secured to the member 13 and having its outer open end connected to a passage 59 connected to outlet port 46a through the plenum chamber and cored passage 54. It will be noted from the foregoing, that the cooling liquid supplied to the cylinder 32 from the plenum chamber through passage 34 and port 37 can only escape from the brake mechanism by flowing through the piston channel 40 as above stated and hence outwardly to the outlet port 46a through the tubular dam as heretofore described. Thus the dam prevents the direct escape of cooling liquid from the cylinder and forces it to pass through the cooling liquid channel 40 of the piston before being discharged from the brake mechanism.

It is pointed out that in a brake of this type, wherein two or more cooling channels are utilized adjacent the metallic friction elements, the problem of equalized liquid flow distribution is important, and since the plenum chambers 49 and 53 constitute in effect, enlarged reservoirs for the cooling liquid, they serve to equalize the flow of cooling liquid therefrom to each of the channels 26 and 40, and also serve to equalize the pressures of the liquid in the channels and in the cylinder 32. Since the liquid in the cylinder 32 has substantially the same pressure as the liquid supplied to the channels 26 and 40, it will serve to operate the piston to effect a brake application, and the opposing forces acting on the unsupported portions of the metallic friction elements 29 and 41 will be substantially equalized, as will be more fully described hereinafter.

Means are also provided, as shown in Fig. 3, for taking the torque of the piston when the friction elements are engaged, this including an anchor pin 60 secured to the member 13 in a bore 61 by means of a nut 62, the pin being provided with an enlarged end portion 63 in slidable engagement with a bore 64 in the partition 39 of the piston. A corresponding anchor pin is mounted in the same manner preferably 180° from the pin shown in Fig. 3, and it will be understood that additional anchor pins may be utilized with the proper spacing if required.

These pins of course permit sliding movement of the piston thereon during a brake application, and at the same time prevent rotation of the piston in its cylinder due to the braking torque.

The above described arrangement of the cooling liquid passages and the plenum chambers is advantageous in providing for the positioning of the inlet and outlet ports 36 and 46a above the vehicle axle, thus serving to provide adequate protection for the conduits leading to these ports. It will be apparent, that in the event one or both of these conduits were connected to the brake below the axle, they might be subject to damage on certain types of highways. With the arrangement shown, however, the ports and conduits are located above the axle.

Although in the construction shown in Fig. 1, only one piston or pressure responsive member is utilized to effect engagement of two metallic friction elements with corresponding composition friction rings, the arrangement is such that the metallic friction elements are supported against distortion in either direction in the same manner as set forth in the above referred to application of Sanford and Eames. The force serving to effect engagement between the metallic friction element 41 and the left composition ring 22 of Fig. 1, as well as the force effective to engage metallic friction element 29 with the other composition friction ring 22, is determined by the area of the piston. This area is substantially the same as that of the friction element areas bounded by the peripheral portions thereof and the areas of each of the friction rings 22. Since the channels 26 and 40 are subjected to the pressure of the circulating cooling liquid which acts to move the piston during a brake application, the pressure of cooling liquid in channels 26 and 40 is substantially the same as that acting on the piston, and the pressure in these channels serves to support those portions of the metallic friction elements which are exposed in the channels and which are unsupported directly either by the member 14 or by the piston. The remaining peripheral portions of the metallic friction elements which bound the annular areas which engage the composition friction rings 22 are supported against distortion by virtue of their attachment to the member 14 or to the piston by means of the rivets shown. Consequently the total force tending to effect engagement between the unsupported portions of the metallic friction elements in one direction supplied by the piston, is balanced by the pressure exerted on the metallic friction elements in the channels 26 and 40, and during engagement, the said annular friction area portions of the elements are prevented from bulging outwardly by virtue of their engagement with the surfaces of the composition friction rings. Thus, the construction is such that the metallic friction elements 29 and 41 may be made relatively thin and flexible, as well as of metals which lack structural strength and resilience, such as copper. It should be noted in this connection, that copper has been found to be an outstanding material for the metallic friction elements in a brake of this type, wherein means are provided for supporting such elements against distortion in either direction, which is necessary in connection with a relatively soft and ductile metal such as copper. The broad aspect of the situation is that the metallic friction elements are supported against distortion in either direction during a brake application, either by the supporting member 14 and piston 33, by the pressure of cooling liquid behind the metallic friction elements, or by engagement of the elements with the rotating composition friction rings 22. The relationships need not of course be exact, since the metallic friction elements, even though thin and flexible, have some strength of their own which may be relied upon to take care of discrepancies in the force balance relationships.

Means are also provided for automatically retracting the piston on release of pressure therefrom, as well as for retracting the disc 20 in order to prevent dragging of the brakes. The O rings 43 and 44 serve, as set forth in the above referred to Sanford and Eames application, to not only retract the piston on release of pressure from the cylinder 32, but also to automatically adjust the position of the piston and the metallic friction element 41 in accordance with wear of the braking surfaces. It will be noted that the O ring is positioned in grooves in the cylinder walls, and that consequently the O rings tend to be distorted to the right with the movement of the piston when subjected to the action of pressure of liquid in the cylinder. On release of the pressure, the O rings tend to return to their undistorted positions, and in view of their frictional engagement with the walls of the piston, tend to return the latter to the left in order to prevent dragging of the brakes. As wear of the braking surfaces occurs, the piston may slide to the right through the O rings, and on release of pressure, the piston will be returned to a new release position by the action of the resilient O rings. The O ring 25 on the lining plate 20 is not subjected to liquid pressure, but is in slidable engagement with the inner surface of the member 18, and on movement of the plate to the right during a brake application, the O ring is distorted to the left relative to the groove 24 by virtue of its frictional engagement with the inner wall of the member 18, and consequently, on release of pressure from the cylinder 32, the plate 20 will be moved to the left by the O ring as soon as the piston is moved to the left by the operation of the O rings 43 and 44. It will be noted that in the embodiment of the invention shown in Fig. 1, the O rings 43 and 44 are of somewhat larger cross-section than the O ring 25. Consequently they are subject to greater distortion during the brake application, and tend to return the piston through a greater distance than that through which the plate 20 is returned by the return of the O ring 25 to its normal undistorted position. This arrangement accordingly provides for clearance not only between the metallic friction element 29 and its adjacent composition friction ring 22, but also between the metallic friction element 41 and its adjacent friction ring 22. It will be apparent from the foregoing, that on release of liquid pressure from the brake mechanism, the retracting movement of the piston should be greater than that of the friction plate 20 in order to insure against dragging of the brake between either of the metallic friction elements and their adjacent composition friction rings, and the O rings on the piston and on the lining disc 20 may be so proportioned as to accomplish this desirable end. Although the O ring 25 is shown as being mounted in a groove on the periphery of the plate 20, it will be clearly understood that one or more O rings may be installed under compression between other portions of the plate 20 and of the member 18 in such a manner as to perform the same function. Thus, no separate return springs are required for the piston, and the brake always remains in adjustment, with the piston being retracted sufficiently following each brake application to prevent any dragging of the brake, while compensating at all times for wear of the friction elements. In the latter connection, it will be noted that the O ring 25 also acts as an automatic slack adjuster for the plate 20, since on movement of the plate to the right, the ring will first distort an amount determined by its cross-sectional dimension and by the dimensions of the groove 24, and will thereafter slide on the inner surface of the member 18, this sliding normally occurring only in the event of wear of the metallic friction element 29 and its adjacent composition friction ring. The plate will be returned to the left, however, following a brake application, only by the amount of distortion of the O ring prior to sliding movement of the latter in the member 18, and consequently a substantially predetermined clearance will be maintained between the metallic friction element 29 and the adjacent composition friction ring 22 when the brake is in release position.

Although various systems may be utilized to control the flow of cooling liquid to and from the brake mechanism and to control the pressure of the liquid therein to effect a controlled application of the brake, one such system is shown in Fig. 6 of the drawings, wherein a pump 65, preferably of the positive displacement type, is driven by a vehicle engine 66. A radiator or heat exchanger 67 is associated with the engine, and provided with a lower tank 68 connected with the inlet of the pump by a conduit 69, and an upper tank 70 connected with the upper portion of the engine water jacket through a conduit 71. The outlet of the pump is connected to an inlet port 72 of a control valve mechanism 73 by a conduit 74, and an outlet port 75 of the control valve is connected to the lower portion of the engine water jacket by means of a conduit 76.

The control valve is provided with a housing 77 having a bore 78 therein, and having a valve spool 79 slidably mounted therein. The valve spool is provided with a groove 80, which with the spool valve in retracted position as shown in Fig. 6, serves to connect the ports 72 and 75. The spool valve is connected by means of a rod 81 and a link 82 with a brake pedal or brake control element 83, and is normally maintained in the position shown by a spring 84. Thus, with the brake pedal in release position, the pump receives water from the lower tank 68 of the radiator, and returns it to the upper tank of the radiator through the conduit 74, inlet port 72 of the valve, groove 80, the outlet port 75 of the valve, the conduit 76, the engine water jacket, and the conduit 71. The control valve housing is also provided with a brake supply port 85 and a brake return port 86, the supply port being connected to the inlet port 36 of the brake by a conduit 87, and the return port 86 being connected to the outlet port 46a of the brake by a conduit 88.

The valve spool 79 is provided with a land 89 at the left of the groove 80, and a second land 90 at the right of the groove, the land 90 being so positioned as to normally prevent communication between the groove 80 and the brake supply port 85. A vent port 91 is also provided in the wall of the bore 78, and is adapted to be closed off on initial movement of the valve spool 79 to the right of the position shown. This port is connected with the upper tank of the radiator by a conduit 92, and the upper tank is vented to atmosphere by means of a conduit 93. In addition to the foregoing, the valve spool is provided with a bore 94 open at its left end, and connected at the right end with the bore 78 by means of a port 95. The right end of the valve spool is provided with a tapered valve portion 96 adapted to engage a valve seat 97 formed on a member 98 secured to the valve housing in the right end of the bore 78 and carrying the return port 86 to which the conduit 88 is connected.

From the foregoing, it will be seen that when the vehicle engine is operating, the cooling liquid from the radiator is normally circulated through the pump and through the control valve and back to the upper tank in the radiator as heretofore stated, circulation of the liquid through the brake mechanism being prevented by the land 90 on the valve spool. In the event it is desired to apply the brake, the pedal 83 is moved to the right, whereupon the valve spool starts to restrict the connection between the ports 72 and 75 and to open the connection between the groove 80 and the brake supply port 85, at the same time closing off the vent port 91 leading to the upper tank of the radiator. Thus, as the valve spool moves to the right, a portion of the circulating liquid is directed to the brake supply port 85 and the conduit 87, and is returned to the bore 78 of the control valve mechanism through the conduit 88 and the return port 86, the liquid circulating through the cooling channels 26 and 40 of the brake as heretofore described. The liquid which returns from the brake is returned to the lower portion of the engine water jacket and thence to the radiator through the port 95 in the spool valve, the bore 94, and past the left end of the land 89 to the valve return port 75, and thence through conduit 76, the engine water jacket, and the conduit 71 leading to the upper tank of the radiator. Thus, as the spool valve moves to the right, the flow of water to the brake is increased, and this, together with the progressive closing of the valve portion 96 toward the seat 97, increases the pressure of the liquid in the brake, due to the increased flow of liquid as well as to the restriction imposed on the return of the liquid from the brake by the closing of the tapered valve portion 96.

From the above, it will be apparent that means are provided for utilizing the cooling system of the vehicle engine to provide for the circulation of cooling liquid through the brake mechanism and for controlling the pressure of the liquid therein at the will of the operator under the control of the pedal 83, increased depression of the pedal resulting in an increased flow of water through the brake mechanism until the connection between the port 72 and 75 is closed, and also increasing the pressure of the liquid in the brake to effect a controlled brake application dependent upon the position of the brake pedal. It should be noted that regardless of whether the brake is applied or released, all the liquid pumped by the pump 65 circulates at all times through the engine radiator, but only circulates through the brake when the brake pedal is depressed. Although one type of system has been shown for operating the brake, it will be understood that the pump may be driven by other means than the vehicle engine, and that if desired, the heat exchanger utilized in connection with the brake system may be separate from the vehicle radiator, and that the brake liquid circulating system may be entirely divorced from the vehicle engine circulating system if desired.

Although the brake mechanism illustrated in Fig. 1 is shown as having two metallic friction elements and two rotating composition friction elements, it will be understood that additional friction elements may be required in some cases in order to obtain a greater friction area, and this may be done as illustrated in Figs. 7 and 8. Referring first to Fig. 7, a brake is shown having four metallic friction elements and four rotating composition friction rings in order to obtain an increased friction area in a given overall brake diameter. The mechanism includes a drum 16 rotatably mounted on an axle 11 and having an annular member 18 secured to the left end of the drum for rotation therewith by means of cap screws 19. A pair of annular lining discs 20 are slidably mounted on the cap screws 19 for axial movement therealong and for rotation with the drum, each of the plates having composition friction rings 22 mounted on either side thereof for rotation therewith. A cylinder member 13 is secured to the axle, and a member 14 is secured to the member 13 by cap screws 15 with an intermediate friction element supporting member 99 clamped therebetween as shown. The construction of the member 13 is substantially the same as that of the member 13 shown in Fig. 1, the member having a cylinder 32 formed therein and a rigid piston 33 slidably mounted therein provided with a channel 40 at the right end thereof closed by a metallic friction element 41. A partition 39 connects the inner and outer walls of the piston and separates the channel 40 from the cylinder. An inlet port 36 is provided in member 13 and connects with a passage 100 therein which in turn, connects with passages 101 and 102 in the members 99 and 14 respectively. The passage 100 connects with the cylinder 32 through a port 103 in member 13, the passage 101 connects with channels 103a and 104 in the intermediate member 99, while the passage 102 connects with an annular cylinder 105 formed in the member 14, by means of a port 106. The channels 103a and 104 in the intermediate member 99 are open respectively at their left and right ends, and are closed by metallic friction elements 107 and 108 secured to the member. The cylinder 105 in the member 14 has a rigid piston 109 mounted therein and having the same construction as the piston in the left hand cylinder, the piston being provided with a partition 110 connecting the inner and outer walls of the piston and separating the cylinder from a cooling liquid channel 111 formed in the piston. This channel is closed at the left end by means of a metallic friction element 112 secured to the left end of the piston. Consequently, when the pistons are subjected to liquid under pressure, as will be more fully described hereinafter, the left hand piston in the cylinder 32 moves to the right to effect engagement of the metallic friction element thereon with the left hand composition friction ring 22 on the left hand disc 20, and the disc is moved to the right to effect engagement of the right hand composition friction ring thereon with the metallic friction element 107 on the intermediate member 99. At the same time, the right hand piston 109 is moved to the left to effect engagement between the metallic friction element 112 and the right hand composition friction ring 22 on the right hand disc 20, and this disc is moved to the left to effect engagement of the left hand composition friction ring thereon with the metallic friction element 108 which is secured to the intermediate member 99.

The flow of cooling liquid in this particular embodiment of the brake mechanism will now be described. The cooling liquid enters the brake through the inlet port 36 and flows into the passages 100 and 101 and 102. From the passage 100, the liquid flows into the cylinder 32 through a port 103 in the member 13, and thence into the channel 40 in the piston through a port 113 in the partition 39 of the piston. From this port, it flows circumferentially through the piston channel 40 in both a clockwise and counterclockwise direction to the upper end of the channel, and is discharged from the channel through a tube or dam 114 secured to the partition 39 at one end, and having the other end slidably mounted in a bore 115 in the back wall of the cylinder 32 as shown. The left end of this tube communicates with an outlet passage 116 in the member 13, and this passage in turn is connected to the outlet port 46a. The passage 116 communicates with the channels 103a and 104 in intermediate member 99 through a passage 117 therein, which in turn is connected with a passage 118 in the member 14. Thus, with regard to the left side of the brake, the liquid enters through the port 36, and reaches the outlet port 46a of the brake through the passage 100, the port 103, the port 113 in the piston partition, the piston channel 40, the tubular member or dam 114, and the passage 116. The liquid is prevented from flowing directly from the inlet port to the outlet port through the annular cylinder by the tubular dam member 114, and consequently the cylinder 32 forms a static pressure chamber subjected to the pressure of the circulating liquid, while the channel 40 in the piston is a liquid circulating chamber which maintains a supply of circulating liquid in intimate contact with the inner surface of the metallic friction element 41.

Referring now to the flow of cooling liquid through the channels 103a and 104, liquid is supplied to the channels from the passage 100, through the passage 101 and a passage 119, and flows circumferentially through the annular channels 103a and 104 in both directions to the upper part of the member 99. It is discharged from the channels into the passage 117 through a passage 120, and is discharged from the brake through the passage 116 and the outlet port 46a. It will be noted that the channels 103a and 104 in the member 99 are separated by means of a partition 121, except where the passages 119 and 120 enter the channels.

Referring now to the right hand portion of the brake, and to the flow of liquid to the channel 111 of the piston 109, fluid flows from the passage 102 in the member 14 to the cylinder 105 through port 106 in the member, as heretofore described, and thence into the channel 111 behind the metallic friction element 112 through a port 122 in the partition 110. From this point, the liquid flows upward around the channel in both a clockwise and counterclockwise direction to the upper portion of the channel, and flows from there into the passage 118 in the member 14 through a tubular dam member 123 secured at its left hand to the piston partition 110 and slidably mounted at its right end in a bore 124 in member 14. Having reached the passage 118, the liquid flows to the outlet port 46a through the passages 117 and 116.

It will be noted from the foregoing, that the inlet passages 100, 101, and 102, form in conjunction with each other an inlet plenum chamber 125 which receives circulating liquid from the inlet port 36 and serves to distribute the liquid uniformly to the various channels through the means already described. In like manner, the passages 116, 117, and 118 form an outlet plenum chamber 126 which receives liquid from the various cooling liquid channels and discharges it from the brake through the port 46a.

Anchor pins are provided in a manner similar to that shown in Fig. 1, and referring to Fig. 8, it will be seen that anchor pins 60 are secured to members 13 and 14, and that these pins have enlarged portions 63 slidably mounted in bores 64 formed in the partitions 39 and 110 of the left and right hand pistons respectively. Additional anchor pins of the same construction are preferably spaced 180° apart from the anchor pins shown in Fig. 8, and serve effectively to prevent rotation of the pistons in their cylinders when the brake is applied. The pistons are provided with inner and outer O rings 43 and 44 as shown in Fig. 1, while the lining discs 20 are provided with O rings 25 at their peripheries. As heretofore described in connection with Fig. 1, these O rings tend to not only retract the piston and the lining disc on release of the brakes, but also act to automatically adjust the positions of the pistons and the lining discs to compensate for any wear which occurs on the friction elements of the brake. Thus the O rings, as set forth in connection with Fig. 1, provide an automatic brake slack adjuster and automatic retracting means without the need for any additional mechanism being utilized.

The area relationships of the pistons and the annular friction area portions of the metal friction elements, as well as the areas of the friction rings 22, are preferably substantially the same as set forth in connection with Fig. 1 in order to obtain the desired balance of forces in opposite directions on the metallic friction elements to prevent distortion thereof in either direction during a brake application, the construction being such that these friction elements are substantially so supported either by fluid pressure, the brake structure, or by the composition friction rings, as to substantially prevent any distortion of the metallic friction elements during a brake application. In addition to the foregoing, the mechanical forces exerted by the pistons in either direction may be so balanced that there is no tendency to distort the intermediate member 99 in either direction with relation to the members 13 and 14.

It will thus be seen, that in the structure of Figs. 7 and 8, novel brake mechanism has been provided so constituted as to incorporate the principle of balancing the forces across the metallic friction elements, as set forth in the above referred to Sanford and Eames application, while at the same time, only requiring two pistons for the engagement of four metallic friction elements with four composition friction ring surfaces. Although one arrangement of this type is shown in the above referred to figures, it will be readily apparent to those skilled in the art that other arrangements may be utilized in such a manner as to obtain proper operation of the brake mechanism utilizing one piston or pressure responsive member for the engagement of each pair of metallic friction elements with each pair of composition friction rings.

It will be evident from the foregoing specification, that novel and efficient brake mechanism has been provided; wherein the number of pressure responsive elements or pistons required is materially reduced, and wherein thin and flexible metallic friction elements may be utilized having an area on one surface adapted to engage composition friction rings and a corresponding area directly opposite thereto unsupported by the brake structure and supported only by the pressure of the cooling liquid in engagement therewith. In addition, substantially the entire area directly opposite the friction area is exposed directly to the action of the cooling liquid, thus resulting in rapid transfer of the heat of friction to the cooling liquid and thence to the heat exchanger of the cooling liquid circulating system. Novel automatic friction element retracting means and slack adjusting means are also provided as heretofore described without the requirement for additional parts for the performance of these desirable functions.

Although the invention has been illustrated and described with considerable particularity, other embodiments and arrangements may well suggest themselves to those skilled in the art, without departing from the spirit of the invention. Reference will therefore be had to the appended claims for a definition of the limits of the invention.

This application is a continuation of my co-pending application filed June 11, 1956, Serial No. 590,618, now abandoned, for Fluid Pressure Brake Mechanism.

What is claimed is:

1. Liquid cooled and liquid pressure operated brake mechanism including a support, a brake member mounted for rotation on the support, a brake disc member connected to the brake member for rotation therewith and for axial movement thereon, an annular friction ring secured to each face of the disc member for rotation therewith, an annular cylinder member secured to the support on one side of the disc, a rigid piston having substantially the same area as each of the friction rings slidably and non-rotatably mounted in the cylinder and having inner and outer wall portions connected by a partition, said piston and cylinder forming a pressure chamber therebetween and said partition forming an outer wall for said chamber, an annular channel in the outer end of said piston adjacent one of the friction rings on said brake disc member, said partition forming a back wall of said channel, an annular metal friction element secured along its inner and outer peripheral portions to the outer end of the piston and forming an outer end wall for said channel, said peripheral portions bounding an annular outer friction surface on said element adapted to engage said one friction ring and having substantially the same area as the ring, substantially the entire inner surface of said element directly opposite said annular friction surface being exposed in said channel, an annular friction element supporting member secured to said support having an annular channel formed therein having its open end adjacent the other of said friction rings, a second annular metal friction element secured along its inner and outer peripheral portions to said supporting member, said peripheral portions bounding an annular outer friction surface on the second element having an area substantially the same as that of the other of said friction rings and adapted to engage said other friction ring, substantially the entire inner surface of said second friction element directly opposite said annular friction surface thereof being exposed in the channel in said element supporting member, inlet and outlet connections to said channels in said piston and friction element supporting member, said connections and channels forming a circuit for the circulation of cooling liquid in said channels in direct engagement with said exposed inner surfaces of said friction elements, and a connection between said circuit and pressure chamber for subjecting said piston to the pressure of liquid in said circuit.

2. Liquid cooled and liquid pressure operated brake mechanism as set forth in claim 1, wherein enlarged plenum chambers are provided in said inlet and outlet connections, each plenum chamber having a pair of separate passages connected thereto and connected respectively to said piston channel and to the channel in said friction element supporting member.

3. Liquid cooled and liquid pressure operated brake mechanism as set forth in claim 1, including cooling liquid supplying means having connection with said inlet and outlet connections, said liquid supplying means including means for circulating cooling liquid through said circuit, means for controlling the flow of liquid through said circuit, and means for controlling the pressure of the liquid in said circuit.

4. Liquid cooled and liquid pressure operated brake mechanism as set forth in claim 1, wherein the open ends of said piston and said friction element supporting member channels have substantially the same area as said piston and are in substantial alignment with the respective adjacent friction rings.

5. Liquid cooled and liquid pressure operated brake mechanism as set forth in claim 1, wherein the cylinder is provided with piston sealing and retracting means comprising grooves in the inner and outer walls of the cylinder and resilient sealing rings of rubber-like material positioned in said grooves under compression between the bottoms of the grooves and the adjacent surfaces of the piston and in sliding frictional engagement with the latter, said sealing rings being subjected to the pressure of liquid in said chamber and being operable on release of pressure from said pressure chamber to retract the piston and disengage the metal friction element thereon from the adjacent friction ring, and means are provided for retracting the brake disc member on retraction of said piston, said last named means including resilient retracting means of rubber-like material interposed under compression between said brake disc member and said rotatable brake member for resiliently opposing axial movement of said brake disc member relative to said brake member, said last named resilient retracting means being connected for movement bodily with one of said last named members and being in sliding frictional engagement with the other of said members.

6. In a disc brake mechanism having a support, a brake member rotatably mounted on the support, a brake disc member connected to the rotatable brake member for rotation therewith and axial movement with respect thereto, an annular cylinder mounted on the support having an annular piston slidably and non-rotatably mounted therein having an outer friction face portion adapted to engage one side of said disc member on outward movement of the piston in the cylinder and to move said disc axially of the rotatable brake member to effect a brake application, a connection for supplying fluid pressure to said cylinder, an annular friction element secured to said support on the other side of the disc member and engageable by the latter on said axial movement thereof by said piston, and means for automatically retracting said piston and disc member to release positions on release of the brake and to adjust said release positions in accordance with wear of said piston friction face portion, disc member and friction element, said means including resilient sealing rings of rubber-like material positioned in grooves associated with the cylinder walls under compression between the bottoms of said grooves and the adjacent piston walls and in sliding frictional engagement with said walls, said sealing rings being subjected at all times to the pressure in said cylinder, and resilient means of rubber-like material positioned under compression between said rotatable brake member and said disc member, said resilient means being in sliding frictional engagement with one of said members and connected for movement bodily with the other of said members, said piston sealing rings and said resilient means being respectively so dimensioned and constituted as to distort without sliding along said piston walls and along said one member when the piston and disc member are moved predetermined distances on movement of the piston to effect a brake application, and to respectively slide along said piston walls and along said one member when said piston and said one member move greater distances.

7. The combination as set forth in claim 6, wherein the resilient piston sealing rings are so dimensioned and arranged with respect to said resilient means as to insure that said predetermined distance said piston sealing rings may distort without sliding is greater than the predetermined distance said resilient means may distort without sliding.

8. Liquid cooled and fluid pressure operated brake mechanism including a support, a brake member mounted for rotation on the support, a brake disc member connected to the brake member for rotation therewith and axial movement therealong and having an annular friction ring portion on either side thereof, an annular cylinder secured to the support on one side of the disc, a rigid annular piston slidably and non-rotatably mounted in the cylinder having substantially the same area as each of said brake disc annular ring portions and having inner and outer wall portions connected by a partition, said piston and cylinder forming a pressure chamber therebetween and said partition forming an outer wall of said chamber, an annular channel in the outer end of said piston adjacent one of the friction ring portions on said brake disc member, said partition forming a back wall for said channel, an annular metal friction element secured along its inner and outer peripheral portions to the outer end of said piston and forming an outer end wall for said channel, said peripheral portions bounding an annular outer friction surface area on said element adapted to engage said one friction ring portion and having substantially the same area as said one friction ring portion, substantially the entire inner surface of said element directly opposite said annular friction surface portion being exposed in said channel, an annular friction element supporting member secured to said support having an annular channel formed therein having an open end adjacent the other of said annular friction ring portions, a second annular metal friction element secured along its inner and outer peripheral portions to said supporting member, said peripheral portions bounding an annular outer friction surface area on said second element having an area substantially the same as that of the other of said annular friction ring portions and adapted for engagement therewith, substantially the entire inner surface of said second friction element directly opposite said annular friction surface thereon being exposed in the channel in said element supporting member, inlet and outlet connections to the channels in said piston and in said friction element supporting member, said connections and channels forming a circuit for the circulation of cooling liquid therethrough in direct engagement with the inner surfaces of said friction elements exposed in said channels, and means including a connection for supplying fluid under pressure to said pressure chamber at a pressure substantially the same as the pressure in said circuit to actuate said piston to effect engagement of said metal friction elements with said friction ring portions of said brake disc member.

9. Liquid cooled and fluid pressure operated brake mechanism including a support, a brake member mounted for rotation on the support, a brake disc member connected to the brake member for rotation therewith and axial movement therealong and having an annular friction ring portion on either side thereof, an annular cylinder secured to the support on one side of the disc, a rigid annular piston slidably and non-rotatably mounted in the cylinder having substantially the same area as each of said brake disc annular ring portions and having inner and outer wall portions connected by a partition, said piston and cylinder forming a pressure chamber therebetween and said partition forming an outer wall of said chamber, an annular channel in the outer end of said piston adjacent one of the friction ring portions on said brake disc member, said partition forming a back wall for said channel, an annular metal friction element secured along its inner and outer peripheral portions to the outer end of said piston and forming an outer end wall for said channel, said peripheral portions bounding an annular outer friction surface area on said element adapted to engage said one friction ring portion and having substantially the same area as said one friction ring portion, substantially the entire inner surface of said element directly opposite said annular friction surface portion being exposed in said channel, an annular friction element supporting member secured to said support having an annular channel formed therein having an open end adjacent the other of said annular friction ring portions, a second annular metal friction element secured along its inner and outer peripheral portions to said supporting member, said peripheral portions bounding an annular outer friction surface area on said second element having an area substantially the same as that of the other of said annular friction ring portions and adapted for engagement therewith, substantially the entire inner surface of said second friction element directly opposite said annular friction surface thereon being exposed in the channel in said element supporting member, inlet and outlet connections to the channels in said piston and in said friction element supporting member, said connections and channels forming a circuit for the circulation of cooling liquid therethrough in direct engagement with the inner surfaces of said friction elements exposed in said channels, a connection for supplying fluid under pressure to said pressure chamber to actuate said piston to effect engagement of said metal friction elements with said friction ring portions of said brake disc member, and control means having connections with said inlet and outlet connections and said pressure chamber connection, said control means including means for circulating a cooling liquid through said circuit, means for controlling the flow of liquid therethrough, means for controlling the pressure of liquid in said circuits, and means for maintaining a fluid pressure in said pressure chamber substantially the same as the pressure in said circuit.

10. Liquid cooled and liquid pressure operated brake mechanism including a support, a brake member mounted for rotation on the support, a brake disc member connected to the brake member for rotation therewith and axial movement therealong, an annular friction ring secured to each face of the disc member for rotation therewith, an annular cylinder secured to the support on one side of the disc, a rigid annular piston slidably and non-rotatably mounted in the cylinder having substantially the same area as each of said friction rings and having inner and outer wall portions connected by a partition, said piston and cylinder forming a pressure chamber therebetween and said partition forming an outer wall of said chamber, an annular channel in the outer end of said piston adjacent one of said friction rings, said partition forming a back wall for said channel, an annular metal friction element secured along its inner and outer peripheral portions to the outer end of said piston and forming an outer end wall for said channel, said peripheral portions bounding an annular outer friction surface on said element adapted to engage said one friction ring and having substantially the same area as said one ring, substantially the entire inner surface of said element directly opposite said annular friction surface portion being exposed in said channel, an annular friction element supporting member secured to said support having an annular channel formed therein having its open end adjacent the other of said friction rings, a second annular metal friction element secured along its inner and outer peripheral portions to said supporting member, said peripheral portions bounding an annular outer friction surface on said second element having an area substantially the same as that of the other of said friction rings and adapted for engagement therewith, substantially the entire inner surface of said second element directly opposite said annular outer friction surface thereof being exposed in the channel in said element supporting member, a dam in said last named channel for preventing the flow of liquid thereby in said channel, a pair of enlarged plenum chambers, connections from one of the plenum chambers leading respectively to the channel in said friction element supporting member adjacent one side of said dam therein and to said pressure chamber, a connection from said pressure chamber to said piston channel, connections from the other of said plenum chambers respectively to said channel in said friction element supporting member adjacent the other side of said dam and to said piston channel at a point approximately 180° from said connection to said pressure chamber, and inlet and outlet ports for supplying cooling liquid to said brake mechanism and for discharging cooling liquid therefrom, one of said ports having a connection with one of said plenum chambers and the other of said ports having a connection with the other of said plenum chambers.

11. Liquid cooled and liquid pressure operated brake mechanism including a support, a brake member mounted for rotation on said support, a pair of brake discs mounted on said brake member for rotation therewith and axial movement therealong, annular friction rings secured to the opposite surfaces of each of said brake discs, annular cylinders secured to said support, said cylinders being mounted respectively adjacent one side of one of said discs and adjacent the opposite side of the other of said discs, rigid pistons each having substantially the same area as each of said friction rings slidably and non-rotatably mounted in said cylinders and having inner and outer wall portions connected by partitions, said cylinders and pistons forming pressure chambers therebetween and said partitions forming outer walls of said chambers, an annular channel in the outer end of each piston adjacent the friction ring on said one side of the adjacent disc, said partitions forming back walls for said channels, annular metal friction elements secured along their inner and outer peripheral portions to the outer ends of said pistons and forming outer end walls for the channels therein, said peripheral portions bounding annular outer friction surface portions on said elements adapted to engage the adjacent friction rings and having substantially the same area as the adjacent rings, substantially the entire inner surfaces of said elements directly opposite said outer friction surface portions being exposed in the corresponding piston channels, an annular friction element supporting member secured to said support and positioned between said discs, said supporting member having annular channels formed on each side thereof and having a partition separating said channels and forming a common back wall for the channels, the channels having their open ends adjacent the remaining friction rings on said discs, annular metal friction elements secured along the inner and outer peripheral portions thereof to the opposite sides of said element supporting member and forming end walls for said channels, said peripheral portions bounding annular outer friction surface portions on the last named elements having areas substantially the same as those of the adjacent friction rings and adapted for engagement by said rings, substantially the entire inner surface portions of said elements directly opposite said outer friction surface portions being exposed in the corresponding channels in said element supporting member, inlet and outlet connections to said channels in said pistons and in said element supporting member, said connections and channels forming a circuit for the circulation of cooling liquid in said channels in direct engagement with the exposed inner surfaces of all said metal friction elements, and means for connecting said circuit and pressure chambers for subjecting said pistons to the pressure of liquid in said circuit.

12. Liquid cooled and liquid pressure operated brake mechanism including a support, a brake member mounted for rotation on the support, a plurality of brake discs secured to the brake member for rotation therewith and axial movement therealong, friction rings secured to each side of each of said discs, annular cylinders secured to the support and positioned on one side of each of said discs, each cylinder having a rigid piston slidably and non-rotatably mounted therein, each piston having substantially the same area as each of the friction rings on the adjacent disc, said pistons having inner and outer wall portions and a partition connecting said wall portions, said pistons and cylinders forming pressure chambers therebetween and said partitions forming outer walls for said chambers, annular channels in the outer end of each piston, said partitions forming back walls for the channels, annular metal friction elements secured along their inner and outer peripheral portions to the outer ends of said pistons, said peripheral portions bounding annular outer friction surface portions on said elements adapted to engage the adjacent friction rings on the discs and having substantially the same areas as said adjacent friction rings, friction element supporting members secured to said support, one of said element supporting members being positioned adjacent each disc on the side opposite the cylinder positioned adjacent said one side of each disc, a channel for cooling liquid in each element supporting member adjacent said opposite side of said adjacent disc, annular metal friction elements secured along their inner and outer peripheral portions to the friction element supporting members, a metal friction element for closing the end of each of the channels in the friction element supporting members, said peripheral portions of said elements bounding outer friction surface portions having substantially the same areas as the pistons on the opposite sides of the adjacent discs and substantially the same areas as the friction rings on said adjacent discs, substantially the entire inner surfaces of each friction element directly opposite said outer annular friction surface portion thereof being exposed in the corresponding channel, inlet and outlet connections to said piston and element supporting member channels, said connections and channels forming a circuit for the circulation of cooling liquid through said channels in intimate engagement with said exposed inner surfaces of said metal friction elements, and means for connecting said circuit and pressure chambers for subjecting said pistons to the pressure of liquid in said circuit.

13. Liquid cooled and liquid pressure operated brake mechanism as set forth in claim 12, wherein liquid cooling and liquid supplying means are provided having connections with said inlet and outlet ports, said liquid supplying means including means for circulating cooling liquid through said circuit upon actuation of the brake, means for controlling the flow of liquid through said circuit, and means for controlling the pressure of liquid in said circuit.

14. In a disc brake mechanism having a support, a brake member rotatably mounted on the support, a plurality of brake disc members secured to the member for rotation therewith and axial movement therealong, a plurality of annular cylinders mounted on the support, one of said cylinders being mounted on one side of each of said disc members, annular pistons slidably and non-rotatably mounted in the cylinders having friction face portions at their outer ends adapted to engage and move an adjacent disc member axially during a brake application, a connection for supplying fluid under pressure to said cylinders, a plurality of stationary annular friction shoes secured to the support on the other sides of said disc members and engageable by the latter on axial movement thereof by said pistons, and means for automatically retracting said pistons and disc members to release positions on release of the brake and for automatically adjusting said release positions in accordance with wear of said piston face portions, disc members and shoes, said means including resilient sealing rings of rubber-like material positioned in grooves associated with the cylinder walls under compression between the bottoms of said grooves and said pistons and in sliding frictional engagement with said pistons, said rings being subjected at all times to the pressure in said cylinders, and resilient means of rubber-like material interposed under compression between said rotatable brake member and each disc member in sliding frictional engagement with one of the members and connected for movement bodily with the other of said members, said sealing rings and resilient means being respectively so dimensioned and constituted as to distort without sliding along said piston walls and along one of the members when the pistons and disc members are moved predetermined distances on movement of the pistons to effect a brake application, and to respectively slide along said pistons and said one member when said pistons and disc members move greater distances.

15. In a disc brake mechanism having a support, a brake member rotatably mounted on the support, a brake disc member connected to the rotatable brake member for rotation therewith and axial movement with respect thereto, a cylinder mounted on the support, a friction element mounted for axial movement on the support having a friction surface adapted for engagement with one side of said disc member, means for preventing rotation of said friction element on the support, a piston slidably mounted in said cylinder for moving the friction element to effect engagement of said friction surface with said one side of the disc member and to move the disc member axially of the rotatable brake member to effect a brake application, a connection for supplying fluid under pressure to the cylinder, a friction element secured to the support on the other side of said disc member and engageable by the latter on said axial movement thereof by said piston, and means for automatically retracting said piston and disc member to release positions on release of the brake and for adjusting said release positions in accordance with wear of the friction elements and disc member, said means including a groove in the wall of said cylinder having a resilient sealing ring of rubber-like material positioned in the groove under compression between the bottom of the groove and the adjacent surface of the piston and in sliding frictional engagement with the latter, said sealing ring being subjected at all times to the pressure of fluid in said cylinder, and resilient means of rubber-like material positioned under compression between said rotatable member and said disc member, said resilient means being in sliding frictional engagement with one of said members and connected for movement bodily with the other of said members.

16. Liquid cooled disc brake mechanism including a support, a brake shoe mounted for axial movement on the support, a stationary brake shoe mounted on the support, each shoe having an annular channel for cooling liquid and annular metal friction elements closing said channels with their inner surfaces exposed in said channels and their outer surfaces being friction surfaces in spaced apart face to face relationship, an annular brake disc mounted on the support for rotation between said element outer surfaces and for axial movement relative to the support, the peripheral portions of said elements being secured to said shoes with the outer surface portions bounded by said peripheral portions being engageable with said disc and the inner surfaces thereof in alignment with said outer surface portions being exposed in said channels, means for circulating cooling liquid under pressure through said channels, fluid pressure responsive means for actuating said first named shoe to effect engagement of the friction element thereof with said disc and to move the disc to effect engagement thereof with the friction element on the stationary shoe, and means for supplying fluid under pressure to said fluid pressure responsive means, said cooling liquid circulating means and said fluid pressure supplying means being so constituted that the actuating force exerted by said pressure responsive means on said first named shoe is maintained substantially equal to the total force exerted by the pressure of the cooling liquid on each of said inner surfaces of said friction elements exposed in said channels and in alignment with said outer surface portions of said elements, whereby the forces exerted in one direction on said inner surfaces of said metal friction elements exposed in said channels are substantially balanced by the forces acting in the opposite direction on said outer surface portions of said elements due to engagement of said outer surface portions with said disc.

References Cited in the file of this patent

UNITED STATES PATENTS

| 1,972,353 | North et al. | Sept. 4, 1934 |
| 2,051,286 | Boykin | Aug. 18, 1936 |
| 2,152,489 | Lamb | Mar. 28, 1939 |
| 2,406,304 | Levy | Aug. 20, 1946 |
| 2,471,858 | Bloomfield | May 31, 1949 |
| 2,664,176 | Whalen | Dec. 29, 1953 |
| 2,710,078 | Cardwell | June 7, 1955 |
| 2,747,702 | Van Zelm | May 29, 1956 |

FOREIGN PATENTS

| 980,742 | France | Jan. 3, 1951 |
| 1,123,407 | France | June 11, 1956 |
| 477,510 | Great Britain | Dec. 31, 1937 |
| 701,725 | Great Britain | Dec. 20, 1953 |
| 739,244 | Great Britain | Oct. 26, 1955 |